Dec. 20, 1966    A. C. SCINTA    3,292,200
WINDSHIELD CLEANER
Filed Jan. 16, 1956    2 Sheets-Sheet 1
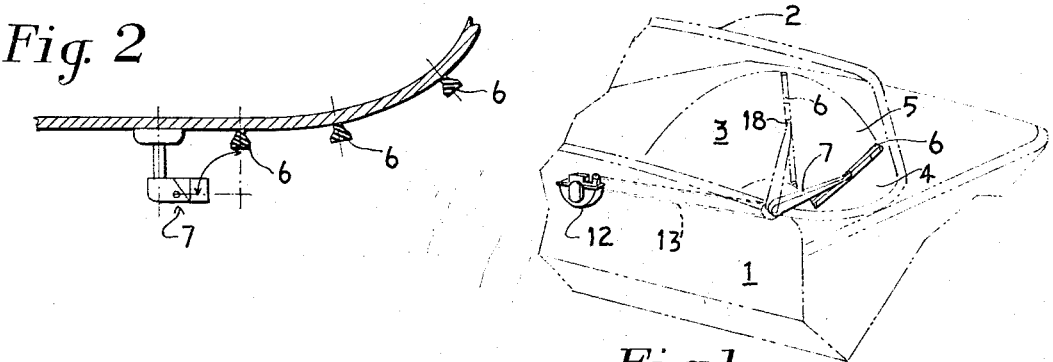
Fig. 2
Fig. 1
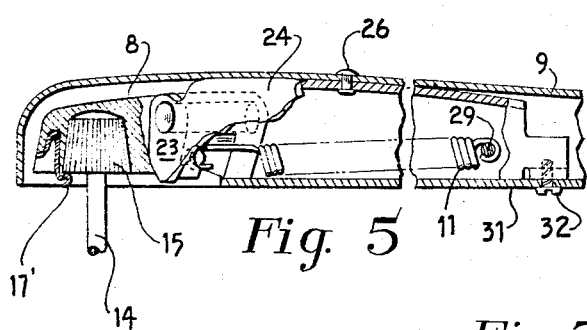
Fig. 5
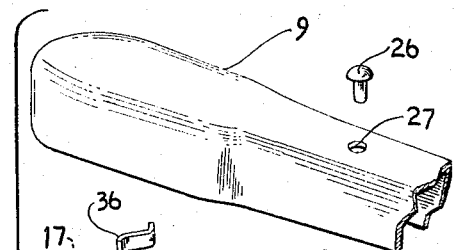
Fig. 7
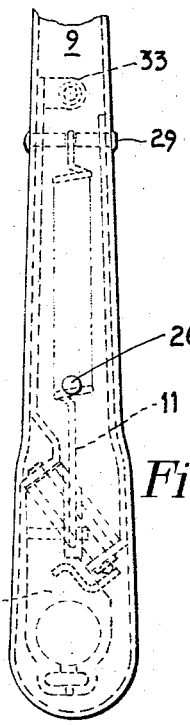
Fig. 3
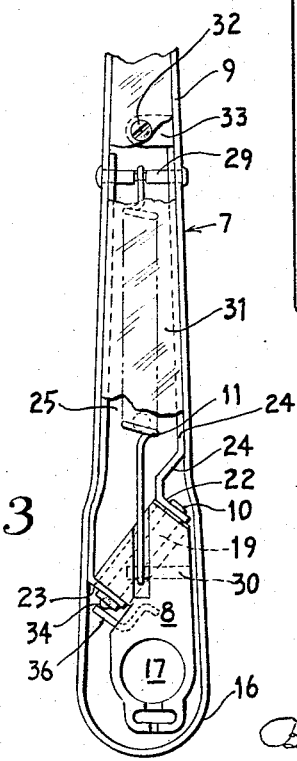
Fig. 4
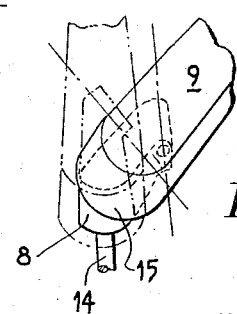
Fig. 6
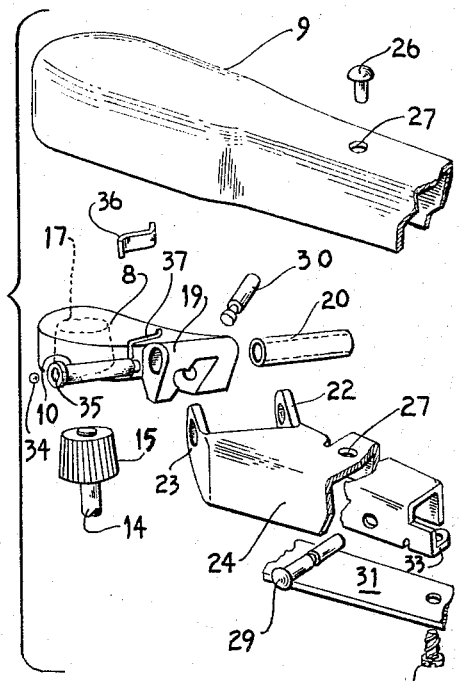
INVENTOR.
Anthony C. Scinta
BY Bean Brooks Buckley & Bean
ATTORNEYS Dec. 20, 1966 A. C. SCINTA 3,292,200
WINDSHIELD CLEANER
Filed Jan. 16, 1956 2 Sheets-Sheet 2
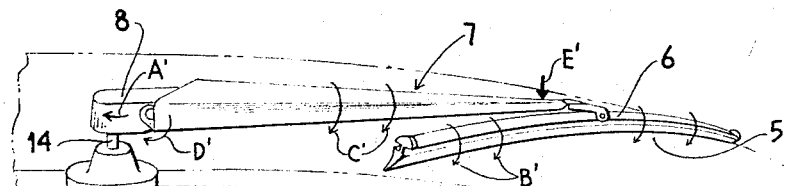
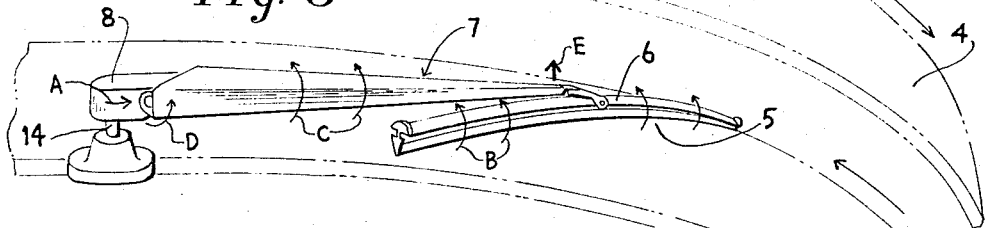
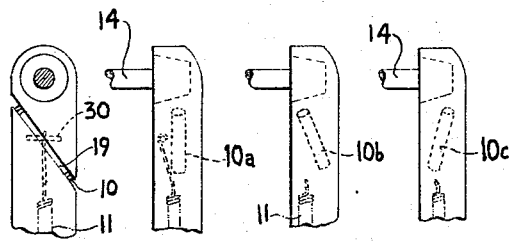
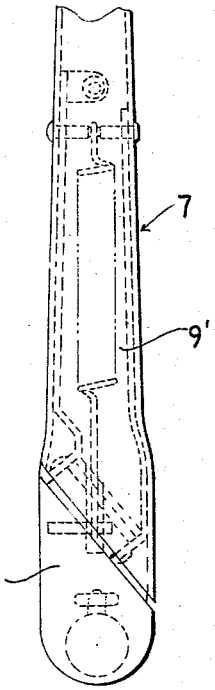
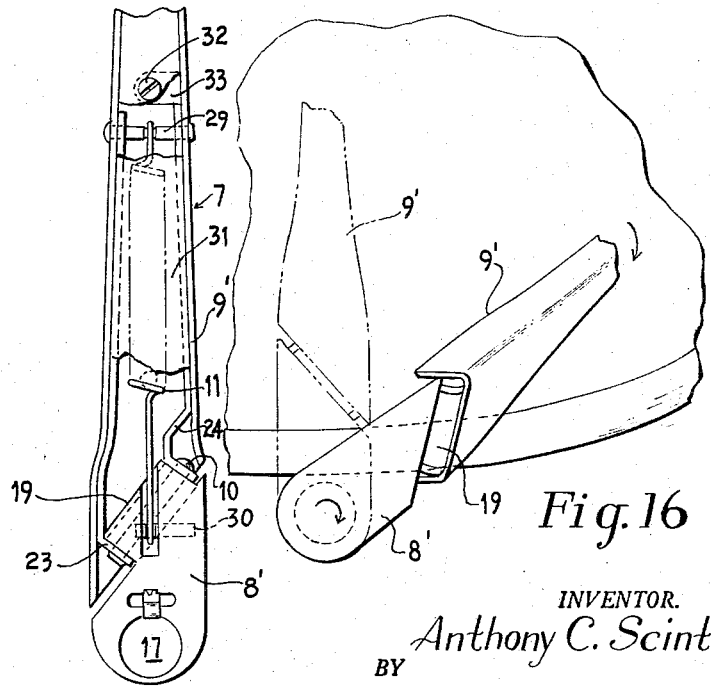
INVENTOR.
Anthony C. Scinta
BY Bean Brooks Buckley & Bean
ATTORNEYS

3,292,200
WINDSHIELD CLEANER
Anthony C. Scinta, Hamburg, N.Y., assignor to Trico Products Corporation, Buffalo, N.Y.
Filed Jan. 16, 1956, Ser. No. 559,180
16 Claims. (Cl. 15—250.35)

This invention relates to the windshield cleaning art, and it has for its objective to provide for wiper normalizing and automatic pressure modifying by which the wiping blade is maintained substantially normal to an associated windshield surface throughout the arc of travel of the blade across the frontal, the lateral and the connecting crest areas thereof as found in the modern curved windshield, and by which the pressure torque loading on the wiper motor imposed by such curvature is counteractingly and advantageously utilized. The general use of this modern so called wrap-around or panoramic windshield has created a new requirement, to provide dependable and efficient vision maintaining equipment for use in wet weather driving. These curved glass shields have been contoured to wrap the glass around the lateral sections to open up panoramic driving vision. To satisfactorily clean this broad field the modern windshield cleaner utilizes a pulley and cable gearing by which the wiper actuating arm or arms are rendered capable of moving over a substantial portion of an arc of 180°. To follow the wide clearing arc obtainable with cable and pulley transmission, an arm must be provided to automatically adjust its attitude to the changing contours of the glass surface in order to secure an effective wiping contact.

Heretofore, the automatic normalizing operation of curved windshield wipers has been carried forward and accomplished by a camming mechanism having a rigidly positioned cam surface section anchored to the rockshaft mounting of the wiper actuating arm and a cam follower section carried by an outer wiper carrying arm part arranged for rotation about an axis extending generally lengthwise of the arm through a suitable pivot support generally radially of the rockshaft, the follower section being adapted to ride the cam surface to so control the rotation and position of the wiper carrying part as the blade is oscillated by the actuating mechanism, such mechanism being more fully shown and described in Patent No. 2,691,186. As disclosed therein, the wiper carrying part is made automatically adjustable about the lengthwise axis of the arm with the angular position of the oscillating drive. This arrangement necessitates the use and separate placement of the position controlling part on the vehicle with respect to the adjustable blade carrying section of the wiper arm assembly.

In conventional arm operation, the spring-loaded blade-carrying arm in use on curved windshields employs the hinged pivot between its inner mounting head section and the other blade-carrying arm section to enable the wiper to rise and fall with changes in the surface contour during the wiping motion. Motion between these arm parts is affected and retarded by friction in the hinge pivots. While the arm is moving out and down over the crest and side areas, the force that is required to overcome the hinge pivot friction has to be taken out of the force developed by the arm spring. Therefore, the net pressure on the shield is the difference between the normal spring pressure and the pivot friction retard. When the blade is coming back from its receded position and up onto the crest, the friction of the pivot movement is about the same but the movement is in the other direction against the force of the spring so the effective pressure between the blade and the windshield becomes the sum of the normal spring pressure and the friction pressure. As indicated, the amount of all of these frictions varies with the amount of the forces involved. When the blade is operating over a fully wet shield, these frictions are almost negligible, but when the blade is operating over a clean shield which is running dry, the greatly increased force required to drive the blade back and forth causes a substantial increase in the friction in the hinge pivot, particularly while the blade is coming up toward the crest. Hence, in the conventional mechanism, there is a regenerative build-up. The greater hinge friction provides a greater pressure between the blade and the windshield, and the greater pressure between the blade and the windshield in turn causes a greater drag. This greater drag causes a further increase in the hinge pivot friction. The combination adds materially to the arm-wiping load, and especially during this period of blade operation on a surface which has been washed clean and is drying.

According to the present invention a new inventive concept is made in the form of an articulated wiper arm assembly affording an inner mounting head and an outer blade carrying section spring loaded and joined together for relative movement about an obliquely positioned hinge axis, the obliquity of which is patterned to conform to surface contours of the crest areas to maintain a carried blade substantially normal to such surface contour while passing thereover. With the hinge axis positioned at substantially the selective obliquity the wiper carrying arm will move in a conical path over the crest area and down onto the side area, the axis of the conical path being coincident with the oblique hinge axis. Instead of the wiper carrying arm moving merely up and down about a transverse pivot, as in the conventional arm, the present wiper carrying arm will have a lateral component of force in its conical path of travel by which the wiper is angularly displaced about the cone axis to poise the blade with its wiping lip extending inwardly toward and substantially in coplanar relation to such axis throughout a gyratory movement. A cooperative pivotal action is thus obtained out of the combination of the arm supporting drive shaft and the diagonally displaced hinge pivot to aid in holding the blade normal to the surface. Rotation of the spring loaded arm section, carried on the oblique pivot as the arm traverses the surface of the glass, moves the arm around the surface of a cone. In its various positions the arm and the blade centerline is in the surface of the cone. As the windshield recedes, the arm moves progressively to new positions along the surface of the cone, and this gives a new directional radius because of the new location of the wiper on this cone, to hold the wiper normal to the surface, and as the arm moves around the cone it changes its direction of tangency.

A further point of distinction found in the biased hinge axis arrangement is that this lateral component is utilized to add to the applied pressure of the spring on the pivoting arm section during its outstroke as the wiper descends over the crest and side areas to improve the wiping contact, and to modify the applied wiping pressure during the instroke as the wiper ascends the lateral and crest areas. The improved wiper actuating arm is therefore designed to employ the turning couple, produced by the friction of the sliding lateral movement, to automatically modify the effective wiping pressure in both directions of movement of the arm in and out over the curved areas. On a fully wet windshield the amount of blade friction is very small and therefore its corrective effect is similarly small. On a clean shield that is running dry, the drag of the blade provides a substantial turning couple which is utilized to unload the abnormal cumulative pressures during the inward movement of the arm and blade in traveling up and over the crest of the curved shield, instead of building up the resistance to movement in the manner common in former types of blade supporting mechanisms. In an actual installation on a motor vehicle this has been demonstrated to show that on the inward stroke the wiper travels as easy or easier back up the lateral and crest areas than it does on the outward stroke over the crest area and down the side area.

In the present invention, the position of the arm embodied hinge axis is adjusted so that the friction of the blade on the windshield produces a torque of such a nature that when the blade is moving outwardly over the crest and side areas of the shield, it will rotate the blade to pull down on the outer arm to increase the pressure between the blade and glass, by way of supplement to the hinge pivot spring for a firmer wiping contact. In this outward movement the wiper also has the assist of the strong slip stream air currents which impinge upon the wiper and stay with it as it passes out over the crest and side areas of the shield. The wiper has to travel downhill from the crest during oscillation of the arm on its outstroke, and back uphill over the crest on its return stroke. The added force of wind impingement exerts a correspondingly greater force under higher car speed travel. This air impingement becomes a retard factor on the return stroke by working against the wiper during its uphill travel. At the same time, on the uphill stroke, the arm spring actuator is being further tensioned, increasing the friction at the hinge pivot between the arm sections. However, during this return movement the blade is moving in the reverse direction, providing a reverse troque to twist the outer arm for reacting through the biased hinge pivot to supply a rotational lifting force at the blade-supporting end of the arm to relieve the blade and thereby to unload the wiper arm assembly of excessive drag burden. The regenerative cycle of arm loading, found in the conventional type is completely absent in the improved arm. The build-up of heavier blade pressures under the clinging heavy troque conditions is avoided. The wiper moving inwardly now returns up to rhythm with the outstroke because of the troque-responsive unloading of the drag burden and the hinge pin friction.

It is therefore apparent that the improved windshield cleaner system embodies a pressure differential in the wiping contact of the two strokes to afford a substantially uniform wiping motion tending to have a lighter wiping pressure and an easier moving upstroke and a heavier wiping pressure on its easier moving downstroke. The two strokes act toward uniformity in wiping acting without sacrificing the wiping function. The action here reverses the ordinary conventional arm function.

The increased pressure on the downhill stroke will be found useful in the removal of depositing snow since the heavier pressured outward travel will tend to plow the snow deposits toward the side of the windshield where it is unloaded into the air stream for being carried off, and any tendency for the snow deposit or freezing rain to stay adhered to the surface will be subjected to such heavier pressure to lessen the formation of freezing sleet film on the field of vision.

An object of the invention is to provide an arm construction in which the arm travel over the deeply curved and receding lateral portion is constrained to a conical path which angularly displaces the arm about the axis of the cone in a manner to develop an uphill, instroke movement in which the arm provides a torque responsive leverage to effect an unloading of an abnormal cling by lessening the pressure in the wiping contact with the surface for maintaining a given rate of wiper oscillation for more effective windshield cleaning.

Again, the invention has for its object to provide a windshield cleaning system in which the torque force developed through abnormal wiper cling to the surface is translated into a pressure modifying factor for lessening the pressure in the wiping contact to preclude extreme loading of the wiper motor and to sustain the given rate of oscillation of the wiper for uniform clearing of the field of vision.

A still further object is to provide a self-contained wiper-normalizing arm in which the normalizing mechanism is incorporated within the arm structure to simplify its installation.

Another object of the invention is to provide a novel mounting for a windshield wiper wherein its actuating arm is articulated and embodies a tension spring, the arrangement being such that the spring imposed load on the pivot between the arm sections is converted essentially into a uni-directional thrust upon the hinge pin, which latter is supported by a ball thrust bearing to receive such thrust in a direction generally lengthwise of the pin, thereby reducing the friction factor to a minimum.

Again, the invention has for its object to provide an improved wiper actuating arm embodying a mounting head secured to an oscillatory shaft and having a pressure applying member hinged at its inner end on a pivot oblique to its longitudinal axis and carrying a wiping element on a fixed axis transverse of the member for bodily movement therewith in a conical path, the wiping element being supported in substantial lateral parallelism with the pressure applying member being laterally torqued through cling of the blade, for automatically modifying the wiping pressure to maintain the wiping action and to avoid unduly overloading the wiper motor.

The foregoing and other objects and advantages of a vehicle window wiper system in accord with this invention will become clearly apparent from the ensuing detailed description and the accompanying drawings wherein FIG. 1 is a fragmentary perspective view showing a windshield wiper system of the instant invention installed in place on a vehicle having a curved windshield;

FIG. 2 is a horizontal section through the windshield of FIG. 1 showing schematically the normalizing action provided by the improved wiper system as the blade moves across the window surface;

FIG. 3 is a fragmentary top plan view of the wiper actuating and normalizing arm of FIG. 1;

FIG. 4 is a fragmentary bottom plan view thereof;

FIG. 5 is a fragmentary longitudinal sectional view through the improved wiper arm;

FIG. 6 is a fragmentary perspective view of the inner end portion of the arm depicting its gyratory action, with the broken lines indicating the position of the wiper carrying section when moving across the frontal area of the windshield, and the solid lines indicating its tilted position when moving across the crest and side areas of the windshield;

FIG. 7 is an exploded fragmentary perspective view of the improved wiper arm;

FIG. 8 is a schematic view in perspective depicting the torque loading outward stroke of the improved arm-wiper assembly;

FIG. 9 is a like view showing the torque unloading inward stroke of the arm-wiper assembly;

FIG. 10 is a view similar to FIG. 3 showing a modified embodiment of the invention;

FIG. 11 is a view similar to FIG. 4 showing the underside of the modified embodiment;

FIG. 12 is a fragmentary bottom plan view showing the hinge pin schematically;

FIGS. 13, 14 and 15 are fragmentary side views showing the hinge pin schematically in different positions for obtaining modified action; and FIG. 16 is a view similar to FIG. 6 illustrating the modified arm embodiment.

Referring more particularly to the accompanying drawings, the windshield wiper system of this invention is primarily adapted to be installed on a vehicle 1 having a curved windshield 2 comprising a broad, relatively flat frontal area 3, and flanking lateral areas 4 joined by substantially conic surface portions constituting crest areas 5 of relatively extreme curvature therebetween to provide a broad field of vision.

The windshield cleaner comprises a wiper 6 of the type which is self-conformable under the spring urge of the wiper actuating arm 7 to the compound curvature of the windshield surface within the path traversed by the wiper, it being understood that while only the wiper blade and arm for the driver's side is shown, a duplicate thereof, but of the opposite hand as will become apparent, is provided on the passenger's side.

Each wiper 6 can be of conventional and well-known form comprising, for example, a flexible surface-conforming frame including pivotally connected yoke and lever members and a flexible backing strip (not illustrated) supporting a squeegee or rubber blade body.

Any suitable power unit can be employed for operating the wiper, such as a fluid pressure motor of known type and generally indicated at 12, the same having an oscillator drive shaft connected, as by the flexible cable and pulley transmission 13, to a rockshaft on drive shaft 14 having a serrated drive burr 15 at its outer end. With the cable transmission, it is possible to obtain a wide sweep of the wipers in arcs closely approaching 180° to clean the broad field of vision through the panoramic windshield.

The wiper actuating arm of this invention comprises generally a mounting or head section 8 and a wiper carrying section 9 hinged thereto as by the hinge pin 10 and urged about the axis of the pivot or hinge pin toward the associated windshield surface by a spring actuator 11.

In accordance with the present invention, the hinge pin 10 of each wiper arm, where more than one is employed, is tilted inwardly toward the longitudinal center of the vehicle to dispose the hinge axis at an oblique angle to the longitudinal axis of the arm, or of its mounting section 8. The exact location of the oblique hinge axis may vary from one directly over the shaft to one further out along the arm than the illustrated position. While traversing the frontal area, the arm will be extended to align its sections, as shown in FIG. 3, but as the arm moves outwardly over the crest area the spring 11 will break the hinge joint and actuate the wiper carrying section 9 downwardly to follow the surface contour of the crest and lateral areas and in so doing to concurrently gyrate the wiper about to maintain its normalcy with respect to the surface. The angular tilt of the hinge axis is predetermined and patterned to conform with the surface contour to achieve this result. As illustrated, the angle of tilt is approximately 52°. By reason of this angular displacement, the outer arm section 9 constitutes a wiper normalizing member to automatically control the position of the wiper during the oscillation of the drive shaft 14. During its oscillatory movement as imparted by the shaft the wiper carrying section 9 describes a conical path about its hinge axis and which imparts another movement to the wiper, this added movement being about the hinge axis and serving to gyrate the blade bodily to hold its wiping edge portion substantially radial with the axis of the cone and therefore normal to the windshield. The result is that the outer arm 9 and its borne wiper are given a compound movement. The hinge movement of the outer arm is also compound in that the outer end of the arm 9 will rise and fall with contour changes in the surface and will yield toward and from the surface as will hereinafter appear more clearly. During this gyratory movement of the normalizing arm section, the attitude of the wiper will be changing from a position normal to the frontal area to positions normal to the crest and lateral areas.

Structurally, the wiper carrying arm section 9 may be in the form of a channeled shell stamped from sheet stock to form a channeled body, the side walls of which may be extended to provide a loose fitting weather protective skirt 16 about the mounting section 8 and the end of the shaft 14. As the self-normalizing wiper arm oscillates, the weather protective skirt 16 will gyrate over the mounting section 8, as shown in FIG. 6, the weather skirt tilting laterally as the normalizing section 9 breaks downwardly about the oblique hinge axis under the urge of its actuating spring 11. The serrated burr 15 has an interlocking fit with the shaft receiving recess 17 formed in the mounting section 8, the two parts being detachably held together by the spring latch 17'. At a suitable place, the arm may be formed with a bend 18 to offset the wiper for parking against the windshield frame. The mounting section 8 may be a die casting formed with a pin bearing 19 and fitted with an oil-impregnated bronze bushing 20 or the like to reduce the friction at this point. The bearing 19 is angularly displaced from the longitudinal axis of the arm but extends generally lengthwise thereof. The wiper normalizing section 9 is formed with a pair of ears 22, 23 likewise angularly displaced for receiving the bearing 19 therebetween. The three parts 19, 22 and 23 constitute hinge knuckles and are secured in this interfitting hinge-forming relation by the hinge pin 10 to join the two arm sections. By this arrangement, the hinge pin will receive end thrust in a direction generally lengthwise of the arm. The knuckles 22, 23 may be formed from the channeled section 9 but preferably are stamped from the side walls of a second channeled insert 24 nested within the spring chamber 25 of the arm section 9 to lend sturdiness to the structure. These two interfitting channeled members may be conveniently secured together, as by a rivet 26, engaged in apertures 27 and suitably clinched as by swaging. A cross pin 29 serves as a supporting strut between the side walls of the two members 9 and 24 on which to anchor the adjacent end of the actuating spring 11 while a second pin 30 fitted in the die-cast head 8 will anchor the opposite end of the spring 11. These pins 29 and 30 may be formed with grooves to retain the spring in position against lateral play. This provides a compact arm structure in which the angularly displaced hinge and the actuating spring 11 are housed. A cover plate 31 may close the spring chamber 25 from the weather and be secured in place by a screw 32 piercing the same and having threaded engagement with an ear 33 on one of the channel members.

As will be apparent from FIG. 4, the actuator spring 11 exerts its line of spring force substantially along the longitudinal axis of the arm and produces a uni-directional thrust on the diagonal hinge pin 10 which is primarily in the direction lengthwise of the arm, and this thrust on the pin is accommodated and supported by a ball bearing 34 that is positioned in a recess or seat 35 in the lower end of the hinge pin where it is retained by a supporting shelf 36 carried by the die-cast head 8. This shelf is fitted in a seat 37 after placement of the ball to provide a ball thrust bearing by which the friction in the hinge is kept to a minimum.

In the modified embodiment of FIGS. 10, 11 and 12 the weather skirt has been eliminated to leave the mounting head 8' exposed. It may be finished off for better appearance. Likewise, the inner end of the channeled arm section 9' will be shaped on a bias at the hinge joint and its shell stamping turned down to overlie the hinge knuckle 19 to partly enclose it.

In operation, the wiper normalizing arm reverses the torque load differential encountered in the conventional arm and puts to a useful purpose the heretofore objectionable torque load developed as the wiper or wipers traverse a drying windshield. The drag on the blade, coupled with the friction in the formerly used arm would slow down the wiping motion to impair vision through the windshield and even cause the motor to stop. On the outstroke the wiper would overtravel under the inertia of the arm-wiper assembly and the impetus afforded by the wind currents.

In contrast, the present invention incorporates a torque responsive structure that functions in reverse to lessen the pressure in the wiping contact on its return stroke uphill for maintaining the wiping rhythm and a constant wiping action for uniformity in the field of vision. This is clearly illustrated in FIG. 9, wherein the wiper shaft 14 is rotating in a counterclockwise direction, as indicated by the arrow A, producing a torque effort, arrows B, in the wiper 6 that tends to lift upwardly on the arm 7, the arrows C, and in so doing to react through the obliquely placed hinge pin 10, arrow D, and controllably rotate the outer arm to swing the wiper laterally from the glass, thereby lessening the pressure in the wiping contact. The resultant effect is that the heretofore objectionable load imposing torque, instead of retarding the blade, is turned to advantage by lightening the load on the arm and motor, arrow E, to enable the wiper to complete its wiping stroke in timed order.

On the reverse stroke, out down over the crest and lateral areas, depicted in FIG. 8, the wiper shaft 14 is rotating clockwise, as indicated by the arrow A', and the wiper is subjected to a reverse torque force, the arrows B', acting to pull down upon the arm 7, the arrows C', and react through the oblique axis clockwise, arrow D', and in so doing to controllably direct the arm to swing the blade more firmly against the glass, arrow E'. This will increase the wiping pressure as the wiper moves out over the crest into the wind stream and down onto the lateral area 4. The diagonally placed hinge axis therefore constitutes a torque converting means which responds to the torque imposed load to lessen the wiping pressure on the instroke for faster travel wiping movement and to increase the wiping pressure on the outstroke to better control the inertia and the wind pressure.

FIG. 16 shows in perspective the wiper arm rotated on its inclined axis and facing the crest or lateral area, turning its wiper blade inwardly toward the glass to maintain its normalcy therewith which is also true with the arm when the sections are aligned, as shown in the broken lines. The torque responsive movement of the wiper carrying arm section will be a laterally swinging motion toward or away from the glass to bear down upon the wiper or to lessen the pressure thereon, such lateral movement being in the direction of the normal plane of attitude of the blade. Consequently, the normalized wiper is subjected to a heavier or lighter pressure in a direction tending to hold the attitude. This is accomplished with a minimum friction in the hinge by reason of the ball bearing so disposed to take the primary uni-directional thrust.

As above stated, the angle of obliquity for the hinge pin is determined in accordance with the surface contour and upon the location of the journal support for the oscillatory shaft, which latter is normal to the windshield. In FIG. 13, the hinge axis lies in a plane at right angles to the rockshaft. By tilting the hinge pin out of this plane, a contact pressure modifying tendency may be superimposed upon that already obtained from its oblique disposition. In FIG. 14, the outer end of the pin has been tilted upwardly, while in FIG. 15 the pin inclines downwardly. This angular displacement of the pin from the horizontal has the effect of giving a blade-contact pressure-producing component out of the driving force.

The oblique displacement of the hinge axis relative to the longitudinal axis of the arm is primary while the angular displacement of the axis in a perpendicular plane is secondary and adds a force component to the normalizing arm when moving in its conical path. The secondary displacement of the hinge axis upwardly or downwardly from the horizontal will act to raise or lower the wiper carrying end of the arm in the direction of secondary inclination to impress its modifying influence on the primary movement in the conical path. By adjusting the secondary, and even the primary displacements, it is possible to more accurately pattern and conform the path of the normalizing wiper to the surface contour. If desired, said adjustments may be made in a suitable manner, as by providing the arm recess 17 with replaceable liners capable of angularly displacing the arm head relative to the shaft.

The foregoing description has been given in detail for clarity and not by reason of limitation since the inventive principles involved are capable of assuming other physical embodiments without departing from the spirit of the invention and the scope of the appended claims.

What is claimed is:

1. An oscillatory windshield wiper arm for use with curved windshields comprising, a mounting section having means thereon adapted to be coupled to a source of motion, a second section having means for mounting a windshield wiper, said second section being hinged to said mounting section for swinging in a conical path about said mounting section and on an axis extending obliquely of said second section, and spring means normally urging said second section about said axis.

2. An oscillatory windshield wiper actuating arm adadapted for use on curved windshields comprising, a mounting section adapted for connection to a rockshaft, a second section pivoted on said mounting section for movement about a conical path on an axis extending diagonally, and spring means extending across said axis and urging said second section about said axis toward an associated windshield surface, whereby the related position of the outer end portion of said second section to the surface contour of an associated windshield is controlled by the degree of movement in said conical path of said second arm section about said axis, said degree of movement being determined by said windshield.

3. An oscillatory windshield wiper actuating arm adapted for use on curved window surfaces comprising, an arm structure having a mounting section adapted for connection to a drive shaft with said arm structure extending generally radially thereof and another section carried by said mounting section for normalizing movement relative to said mounting section in a predetermined conical path, and means for urging said other section toward an associated window surface in said conical path for determining the extent of normalizing movement in accord therewith.

4. An oscillatory windshield wiper actuating arm adapted for use on curved window surfaces comprising, a mounting section adapted for connection to a rockshaft, a second section having means for mounting a windshield wiper, said second section being pivoted on said mounting section for movement relative thereto through a conical path with extended portions of such movement intersecting the surface of the window, and means for maintaining said wiper in contact with a window surface.

5. A cleaner for curved windshields having a laterally disposed crest area, comprising a wiper, a driveshaft mounted wiper arm for oscillating said wiper over the crest area with an outstroke moving downwardly thereover and an instroke moving upwardly thereover, means for holding said wiper against the surface to be wiped, said wiper arm comprising a first arm section adapted to be mounted on said driveshaft against substantial movement towdard and away from said windshield during cleaner operation and a second arm section mounted on said first section on a pivot axis which is oblique to the longitudinal axis of said second section, whereby said wiper arm imposes a relatively lighter wiping pressure on the instroke than on the outstroke during the travel of the wiper over the crest area.

6. A windshield cleaner for a curved windshield having a frontal and a lateral area, comprising a wiper, a driveshaft mounted actuating arm for said wiper operable to stroke the wiper toward and away relative to said lateral area, means for holding said wiper against the surface to be wiped, said actuating arm comprising a first section adapted to be mounted on said driveshaft against substantial movement toward and away from said windshield during cleaner operation and a second section mounted on said first section on a pivot axis which is oblique to the longitudinal axis of said second section whereby said wiper arm lessens the pressure of wiper blade wiping contact in response to an abnormal torque imposed on the wiper when moving away from the lateral area.

7. A windshield cleaner for a curved windshield having a frontal and a lateral area comprising a wiper, a driveshaft mounted actuating arm for said wiper operable to stroke the wiper toward and away relative to said lateral area, means for holding said wiper against the surface to be wiped, said actuating arm comprising a first actuating arm section mounted on said driveshaft against substantial movement toward and away from said windshield during a cleaner operation, and a second actuating arm section for mounting said wiper mounted on said first section on a pivot axis which is oblique to said second section, said actuating arm being responsive to the torque imposed upon the wiper during its stroke in a direction away from said lateral area to lessen the pressure in its wiping contact and being responsive to the wiper imposed torque during its stroke in a direction toward said lateral area to increase the pressure of wiping contact.

8. For use on a curved windshield having a frontal area and a lateral area joined together by a merging corner area, providing a continuous path wherein the windshield merging surface recedes from the frontal area to the lateral area, a shaft supported arm section rigidly mounted on an oscillating shaft, and an outer arm section pivoted on the shaft supported section by a pivot that is positioned oblique to the radial direction of the outer section in such a manner that movement of the outer section will be fixed within a conical path tending to lift the outer section up as it moves back off from the receded area toward the adjacent frontal area of the windshield whereby the wiper will override excessive windshield surface cling.

9. For use on a curved windshield having a frontal area and a lateral area joined together by a merging corner area, providing a continuous path wherein the windshield merging surface recedes from the frontal area to the lateral area, a shaft supported arm section rigidly mounted on an oscillating shaft, and an outer arm section pivoted on the shaft supported section by a pivot that is positioned oblique to the radial direction of the outer section whereby the outer section will follow a fixed conical path in its movement toward and away from the windshield surface while tending to keep the outer section attitude substantially parallel to the surface of the windshield over which it is moving.

10. A windshield wiping mechanism for use on a curved windshield comprising a wiper carrying arm section that is mounted on a pivot relative to an oscillating rockshaft, resilient means for delivering a wiping contact pressure between said wiper and said windshield surface, the position of said pivot serving to regulate the attitude of said blade with respect to said windshield surface and hold it substantially normal thereto throughout the oscillating movement of said blade, the position of said pivot also serving to transform a part of the oscillation producing force into a contact pressure modifying tendency and with said pivot positioned both oblique to the axis of said wiper carrying arm section and in a plane that is oblique to the axis of said rockshaft to superimpose another modification in the amount of said pressure of contact between said wiper and said windshield surface.

11. A windshield wiping mechanism for use on a curved windshield comprising a wiper mounted on a support on an oscillating rockshaft for movement back and forth over the surface of said windshield, said support for said blade including an arm member coupled to said rockshaft and a blade carrying arm section that is pivoted to said arm member on an axis diagonal to the longitudinal axis of said arm section and with said diagonally positioned pivot in a plane that is oblique to the axis of oscillation of said rockshaft, and means for providing wiping pressure to said wiper blade.

12. A motor vehicle windshield cleaner for a curved windshield surface, comprising an oscillatory wiper adapted to move outwardly and downwardly toward the side of the vehicle on one wiping stroke and upwardly and inwardly on the return wiping stroke, means for holding said wiper against the surface to be wiped, and means operable to impose different wiping pressures on the wiper on the two wiping strokes with the relatively lighter wiping pressure occurring during the return stroke, said last-mentioned means comprising an articulate wiper arm having a first section mounted on a driveshaft against substantial movement in a direction toward and away from an associated windshield during cleaner operation, and a second section for carrying said wiper mounted on said first section for movement about an axis which is oblique to the axis of said second section.

13. A motor vehicle windshield cleaner for a curved windshield surface comprising a wiper, an oscillatory arm adapted to move said wiper outwardly and downwardly toward the side of the vehicle in one wiping stroke and upwardly and inwardly on the return wiping stroke, said wiper arm comprising a first driveshaft mounted section mounted against substantial movement toward and away from said windshield during cleaner operation, and a second arm section for carrying said wiper mounted on said first section on an axis oblique to said second section, and means for holding said wiper against the surface to be wiped, said wiper arm being operable to impose different wiping pressures on said wiper on the two wiping strokes with the relatively lighter wiping pressure occurring during the return stroke, said wiper arm also acting to control the attitude of the wiper on the surface to maintain substantial normalcy relative to the windshield throughout its path of travel.

14. A wiper arm for a curved windshield having frontal, lateral and connecting crest areas, said arm comprising an inner mounting section and an outer wiper, carrying section joined together by a spring hinge, the axis of said hinge being oblique to the longitudinal axis of the arm and slanting outwardly therealong in a direction from the lateral area.

15. A windshield cleaner for a curved surface, comprising a wiper, an oscillatory drive shaft therefor, an arm assembly fixed at one end on the shaft and having a mounting head and a wiper carrying arm joined together by a hinge, means for holding said wiper against the surface to be wiped, said wiper carrying arm having a primary angular displacement about said hinge from the longitudinal axis of the mounting head for normalizing the wiper relative to the surface and a secondary angular displacement in a direction transverse to the first displacement for impressing a predetermined modification on the arm to vary the pressure in the wiping contact.

16. A cleaner for a curved windshield having a laterally disposed crest area, comprising a wiper, a driveshaft mounted arm for oscillating said wiper over the crest area with an outstroke moving downwardly thereover and an upstroke moving upwardly thereover, said arm including a first section mounted on said driveshaft against substantial movement toward and away from an associated windshield during a cleaner operation, and a second section mounted on said first section for movement about an axis which is oblique to the axis of said second section, said arm acting to superimpose modified wiping pressures on both the inward and outward strokes, and means for holding said wiper against the surface to be wiped.

References Cited by the Examiner

UNITED STATES PATENTS

| | | | |
|---|---|---|---|
| 83,572 | 10/1868 | Walter | 16—189 |
| 432,841 | 7/1890 | Seemann | 292—285 |
| 1,964,109 | 6/1934 | Cusset | 15—250.9 |
| 2,387,564 | 10/1945 | Christel | 15—250.8 |
| 2,401,961 | 6/1946 | Rappl | 15—250.8 |
| 2,691,186 | 10/1954 | Oishei et al. | 15—250.8 |
| 2,849,742 | 9/1958 | Gores | 15—255 |

CHARLES A. WILLMUTH, *Primary Examiner.*